United States Patent
Schmaling

(10) Patent No.: US 7,686,584 B2
(45) Date of Patent: Mar. 30, 2010

(54) ELASTOMERIC BEARING WITH HEATABLE SHIMS

(75) Inventor: David N. Schmaling, Southbury, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 756 days.

(21) Appl. No.: 11/505,725

(22) Filed: Aug. 17, 2006

(65) Prior Publication Data

US 2008/0044283 A1   Feb. 21, 2008

(51) Int. Cl.
B64C 27/35 (2006.01)
(52) U.S. Cl. .................... 416/134 A; 384/221
(58) Field of Classification Search ............ 416/132 R, 416/134 A, 134 R; 384/220, 221, 222, 476
See application file for complete search history.

(56) References Cited

U.S. PATENT DOCUMENTS 3,924,825 A * 12/1975 Peschke .................... 244/46
4,231,705 A    11/1980 Watson
4,357,057 A * 11/1982 Peterson et al. ............. 384/125
4,886,419 A * 12/1989 McCafferty ............. 416/134 A
4,927,481 A *  5/1990 McGregor .................. 156/245
5,156,527 A   10/1992 Pancotti
5,620,305 A    4/1997 McArdle
5,938,963 A *  8/1999 Tanis ......................... 219/551
6,140,720 A * 10/2000 Certain ........................ 310/64
6,984,109 B2   1/2006 Bagai

OTHER PUBLICATIONS

Kiran Singh, "The Servo Flap Controlled Rotor," http://www.helis.com/howflies/servo.php.
"Fast Acting Large Stroke Actuator," http://www.mide.com/pdf_html/Fast_acting_lrg_stroke_actuator.htm.
Jinwei Shen, Mao Yang, and Inderjit Chopra, "Swashplateless Helicopter Rotor with Trailing Edge Flaps for Flight and Vibration Control," Journal of Aircraft, vol. 43, No. 2, Mar.-Apr. 2006 pp. 346-352.

* cited by examiner

Primary Examiner—Edward Look
Assistant Examiner—Nathaniel Wiehe
(74) Attorney, Agent, or Firm—Carlson, Gaskey & Olds PC

(57) ABSTRACT

An electrically heatable elastomeric bearing provides a multiple of elastomeric material layers and a multiple of shim layers. At least one of the multiple of shim layers includes an electrically heatable shim layer.

22 Claims, 5 Drawing Sheets

ELASTOMERIC BEARING WITH HEATABLE SHIMS

BACKGROUND OF THE INVENTION

The present invention relates to an elastomeric bearing, and more particularly to a heatable elastomeric bearing with integral heating elements which facilitates cold weather operation.

Elastomeric bearings are used in many applications. Elastomeric bearings typically include alternating layers of elastomeric material and metallic or composite shims. These elastomeric bearings often replace non-lubricated or self-lubricated bearings such as Teflon fabric lined bearings. Typical aerospace elastomeric bearing applications include spherical rod end bearings for pitch control rods and dampers, spherical blade retention bearings for fully articulated rotors, and cylindrical bearings for semi-articulated rotors and fluid-elastic damper seals.

Cold temperatures may reduce the service life and static strength of elastomeric bearings as the elastomeric material therein may be relatively sensitive to such cold temperatures. The elastomeric bearings may also stiffen when exposed to cold temperatures. This may result in an increased spring rate that transfers increased loads to the mating components that may reduce fatigue life of the mating components. An increased spring rate may also result in dynamic behavior alteration of systems which utilize the elastomeric bearings.

In rotary-wing aircraft operations, it is common practice to use a warm-up procedure to soften the elastomeric bearings prior to rotor start-up. This typically involves pilot movements of the collective, cyclic, and yaw controls, with gradually increasing amplitude and frequency. This procedure is time consuming and is difficult due to the bulky cold weather gear often worn by the pilots and/or ground crew. The procedure is also less effective on certain elastomeric bearings that do not move significantly in response to control movement (i.e. damper bearings).

For rotary wing aircraft which utilizes a servo flap control system, a torsional stiffness constraint is typically imposed on the spherical elastomeric blade retention bearing. Variations in this spring rate due to cold temperature may affect stability and dynamic characteristics of the rotor. Further complicating pre-flight procedures of aircraft with servo flap control, stick movement will not generate movement of the blade retention bearings. For fluid/elastic damper systems, current pre-flight warm-up procedures may be ineffective at warming the elastomeric cylindrical "seals", resulting in high initial spring rates, with increased loadings on the damper retention hardware. This may result in the aforementioned dynamic and service life concerns.

Accordingly, it is desirable to provide a system and method to warm-up elastomeric bearings prior to rotor start-up.

SUMMARY OF THE INVENTION

The electrically heatable elastomeric bearing according to the present invention provides an electrically heatable elastomeric bearing shim which replaces one or more shims currently used in non-heatable elastomeric bearing designs. The shims include two shim layers which sandwich a heater mat therebetween. The heater mat includes a wire or heating foil encapsulated between two insulating layers. An electrical jumper connects the heatable shims to each other and to a power supply. The wire jumpers provide slack to permit free relative movement of the electrically heatable elastomeric bearing.

During operation, the shear deformable elastomeric material layers shear within the constraints of the heatable shim layers. The heatable shim layers guide the elastomeric shear deformation such that the displacement trajectory of a first member relative to a second member is a predefined movement. The heatable shim layers facilitate the maintenance of a constant bearing spring rate to prevent an increase in bearing loads and reduced strength that may otherwise occur at cold temperatures.

In the illustrated rotary-wing aircraft rotor head embodiment, the elastomeric bearings are heatable using on-board or external power sources prior to rotor start-up. Inflight, the power need only be selectively applied as strain energy will warm the elastomeric material layers.

The present invention therefore provides a system and method to warm-up elastomeric bearings prior to rotor start-up.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
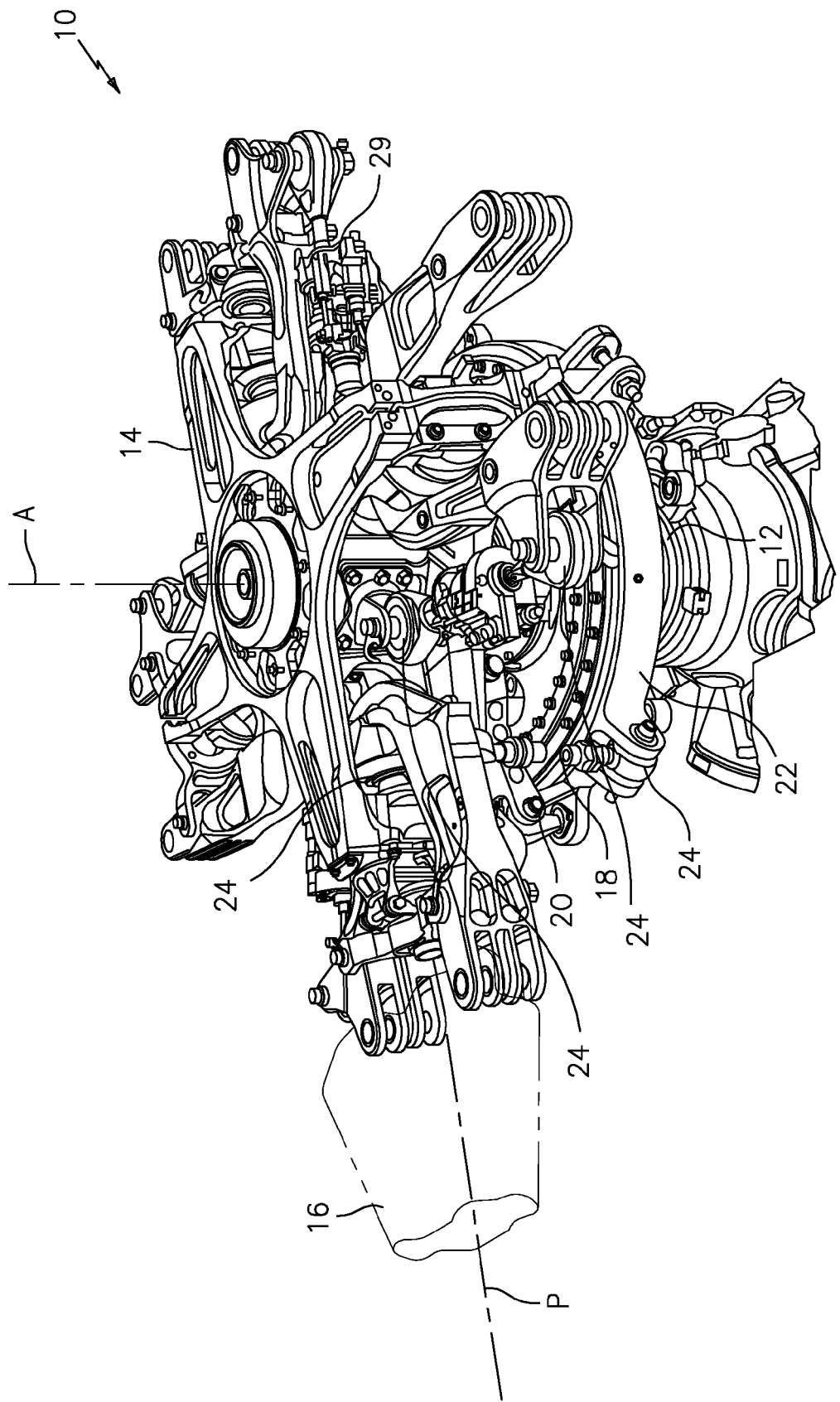
FIG. 1 is a general perspective view an exemplary rotary wing aircraft rotor head embodiment for use with the present invention.

FIG. 1 illustrates a general perspective view of a rotor system 10 which includes a rotor shaft 12 driven in conventional fashion by an engine through a reduction gearing for rotation about an axis of rotation A. A rotor hub 14 is mounted to the rotor shaft 12 for rotation therewith about an axis of rotation to support a multiple of rotor blade assemblies 16 (illustrated schematically) therefrom.

Each blade assembly 16 is mounted to the rotor hub 14 so as to be flexible about a pitch change axis P. It should be understood that various attachment systems and rotor blade pitch change systems are usable with the present invention. Pitch change loads are imparted to each rotor blade assembly 16 by pitch control rods 18 which are articulatably connected at one end to the rotor blade assembly 16 at a pitch horn 20. The opposite end of the pitch control rod 18 is articulately connected to a swash plate assembly 22.

As shown, an electrically heatable elastomeric bearing 24 may be utilized in the rotor system 10 at a multitude of locations for a multitude of purposes. Typical applications include spherical rod end elastomeric bearings for pitch control rods and dampers, spherical blade retention elastomeric bearings for fully articulated rotors, and cylindrical bearings for semi-articulated rotors and fluid-elastic damper seals as well as other locations.

Figure 2:
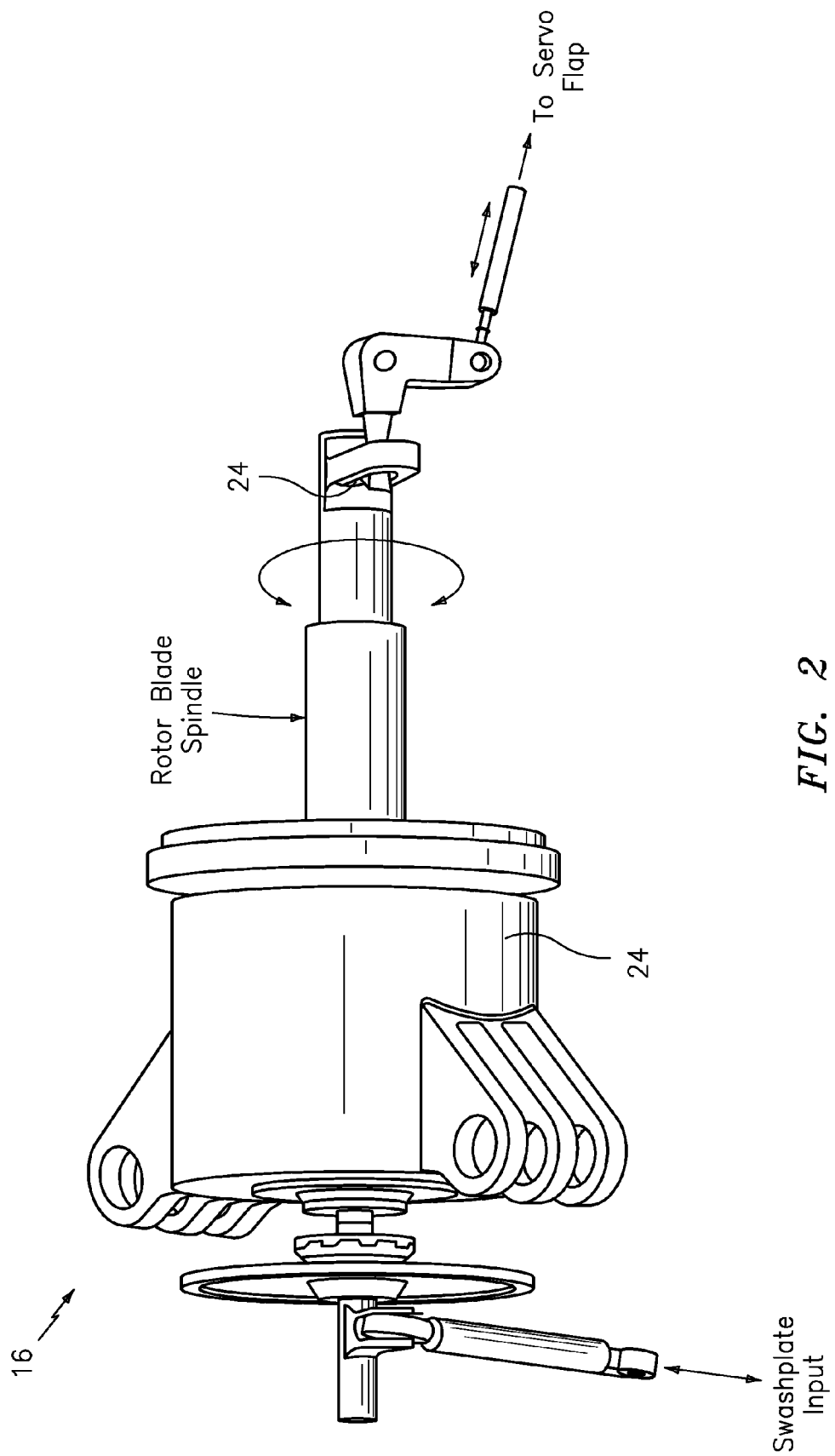
FIG. 2 is a general perspective view a servo flap rotor blade for use with the present invention.

It should be understood that although the elastomeric bearings in the illustrated embodiment are depicted within a rotor system 10, the elastomeric bearings of the present invention are not limited to just rotor head applications but may be in any location in which elastomeric bearings are utilized such as in substitution for non-lubricated or self-lubricated bearings such as Teflon fabric lined bearings. The heatable elastomeric bearings 24 are most preferably utilized in rotor systems which are of the fully articulated rotor system type with servo flap control 16S (FIG. 2) as such rotor systems have spherical elastomeric blade retention bearing 24S which are not readily exercised through pilot control during conventional preflight procedures.

Figure 3:
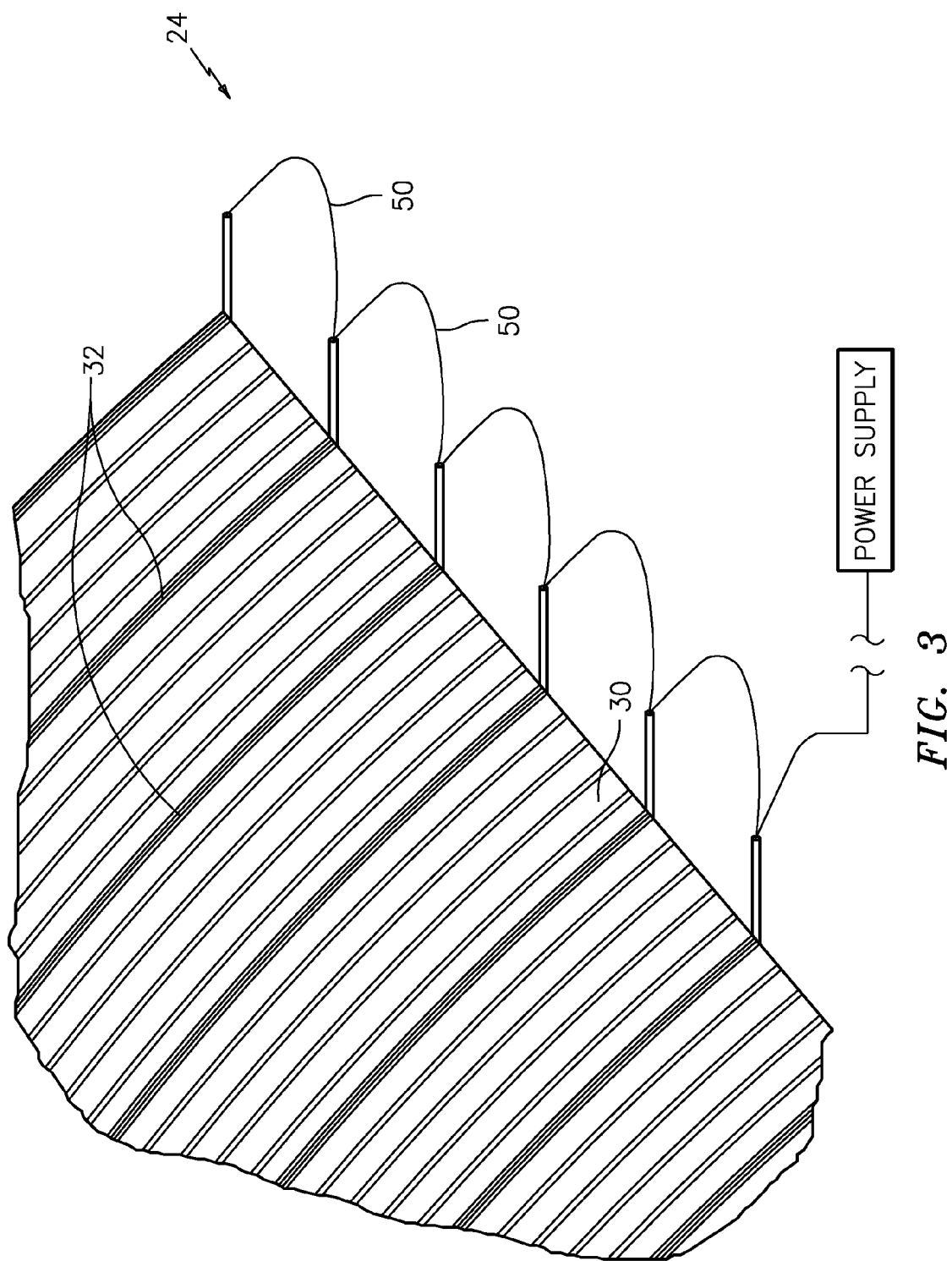
FIG. 3 is a sectional view of heatable elastomeric bearing.
Figure 4:
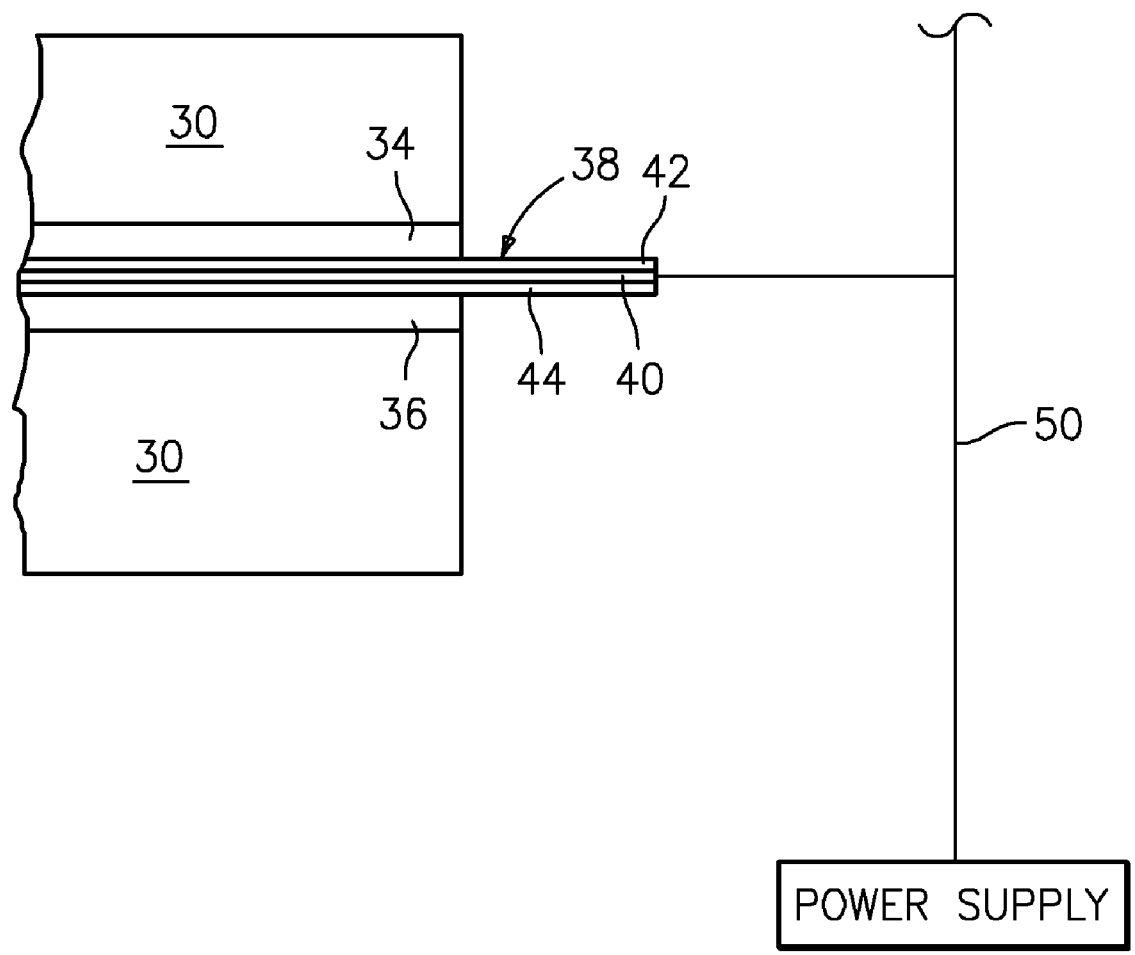
FIG. 4 is an expanded sectional view of a heatable shim layer within the heatable elastomeric bearing.

Referring to FIG. 3, the electrically heatable elastomeric bearing 24 generally includes a plurality of shear deformable elastomeric material layers 30 separated by electrically heatable shim layers 32 formed of high-stiffness constraining material such as composite or metallic layers. Each heatable shim layer 32 preferably includes a first outer shim 34 and a second outer shim 36 which are preferably manufactured of a metallic material to sandwich a heater mat layer 38 therebetween to conduct thermal energy therefrom (FIG. 4). Preferably, the insulators electronically insulate the thermal element 40 but conduct thermal energy to the shims 34, 36. The heater mat layer 38 is preferably a wire or heating foil thermal element 40 encapsulated between a first insulator 42 and a second insulator 44 typically manufactured of a non-metallic material such as fiberglass (FIG. 4). Preferably, the electrically heatable shim layers 32 are equally spaced throughout the heatable elastomeric bearings 24 stack-up, but need not be utilized in every shim layer. Most preferably, an electrically heatable shim layer inner endplate 46 and an electrically heatable shim layer outer endplate 48 mount the electrically heatable elastomeric bearing 24 to a first member A and a second member B of, in the illustrated non-limiting embodiment, the rotor system 10 (FIG. 5).

Referring to FIG. 4, an electrical jumper 50 preferably connects each thermal element 40 within the electrically heatable elastomeric bearing 24 to a power supply which powers each thermal element 40. Each electrical jumper 50 extends from the electrically heatable elastomeric bearing 24 to provide slack which permits free relative movement of the deformable elastomeric material layers 30.

It should be understood, however, that various shim materials of differing rigidity will also benefit from the present invention such that an alternate design would integrate the insulating layers into two composite shim layers.

Figure 5:
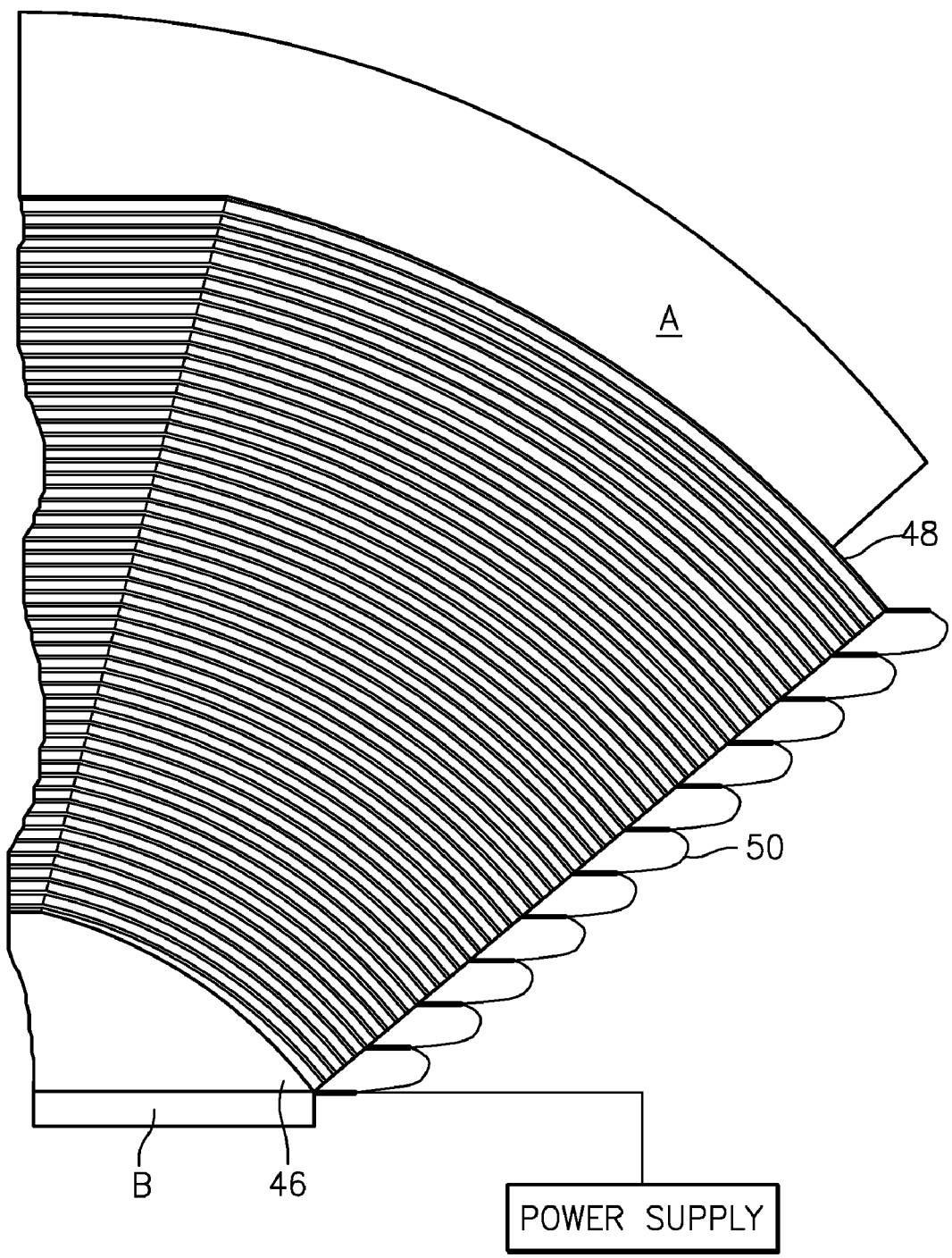
FIG. 5 is a perspective view of heatable elastomeric bearing.

Referring to FIG. 5, the heatable elastomeric bearing 24 operates as a coupler between the first member A and the second member B. During operation, the shear deformable elastomeric material layers 30 shear within the constraints of the shim layers 32. The shim layers 32 guide the elastomeric shear deformation such that the displacement trajectory of the first member A relative to the grounding member B is a predefined movement. The heatable shim layers 32 facilitate the maintenance of a constant bearing spring rate to prevent an increase to bearing loads and reduced strength that may otherwise occur at cold temperatures. In the illustrated aircraft rotor head embodiment, the heatable elastomeric bearing 24 are heatable using on-board or external power sources prior to rotor start-up. Inflight, the power need only be selectively applied as strain energy will warm the elastomeric material layers 30.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An electrically heatable elastomeric bearing comprising:
   a multiple of elastomeric material layers; and
   a multiple of shim layers, each of said multiple of shim layers between two of said multiple of elastomeric material layers, at least one of said multiple of shim layers includes an electrically heatable shim layer.

2. The electrically heatable elastomeric bearing as recited in claim 1, wherein said heatable shim layer further comprises:
   a first outer shim;
   a second outer shim; and
   a heater mat layer sandwiched between said first outer shim and said second outer shim.

3. The electrically heatable elastomeric bearing as recited in claim 2, wherein said first outer shim and said second outer shim are manufactured of a metallic material.

4. The electrically heatable elastomeric bearing as recited in claim 3, wherein said heater mat layer further comprises:
   a first insulator;
   a second insulator; and
   a thermal element encapsulated between said first insulator and said second insulator, said thermal element is electrically heatable.

5. The electrically heatable elastomeric bearing as recited in claim 4, wherein said first insulator and said second insulator are manufactured of a non-metallic material.

6. The electrically heatable elastomeric bearing as recited in claim 1, wherein said at least one electrically heatable shim layer includes a multitude of electrically heatable shim layers, each of said multiple of electrically heatable shim layers spaced between at least two of said multiple of elastomeric material layers.

7. The electrically heatable elastomeric bearing as recited in claim 6, wherein at least one of said multiple of shim layers are interspaced between two of said multiple of heatable shim layers.

8. The electrically heatable elastomeric bearing as recited in claim 6, wherein said multiple of electrically heatable shim layers are interconnected by a respective multiple of electrical jumpers.

9. The electrically heatable elastomeric bearing as recited in claim 8, wherein each of said respective multiple of electrical jumpers provide enough slack to permit relative movement of said multitude of electrically heatable shim layers.

10. The electrically heatable elastomeric bearing as recited in claim 1, further comprising an electrically heatable shim layer inner endplate and an electrically heatable shim layer outer endplate which cap the multiple of elastomeric material layers.

11. The electrically heatable elastomeric bearing as recited in claim 1, wherein said electrically heatable elastomeric bearing is a spherical elastomeric bearing.

12. The electrically heatable elastomeric bearing as recited in claim 1, wherein said at least one electrically heatable shim layer defines a multiple of electrically heatable shim layers, said multiple of electrically heatable shim layers less than said multiple of shim layers.

13. A rotor system comprising:
    a first rotor system member;

a second rotor system member; and an electrically heatable elastomeric bearing mounted to said first rotor system member and said second rotor system member, said electrically heatable elastomeric bearing comprises:
  a multiple of elastomeric material layers; and
  a multiple of shim layers, each of said multiple of shim layers between two of said multiple of elastomeric material layers, at least one of said multiple of shim layers includes an electrically heatable shim layer.

14. The system as recited in claim 13, wherein said electrically heatable elastomeric bearing comprises:
  a multiple of elastomeric material layers;
  a multiple of shim layers, each of said multiple of shim layers between two of said multiple of elastomeric material layers, at least one of said multiple of shim layers include an electrically heatable shim layer, each of said electrically heatable shim layers spaced between at least two of said multiple of elastomeric material layers and interconnected by a respective multiple of electrical jumpers; and
  a power source in electrical communication with said respective multiple of electrical jumpers.

15. The system as recited in claim 13, wherein said electrically heatable elastomeric bearing is a spherical elastomeric blade retention bearing.

16. The system as recited in claim 13, wherein said electrically heatable elastomeric bearing is a spherical elastomeric blade retention bearing within a servo flap control system.

17. The system as recited in claim 13, wherein said electrically heatable elastomeric bearing is an elastomeric spherical pitch control rod end bearing.

18. The system as recited in claim 13, wherein said electrically heatable elastomeric bearing is an elastomeric spherical damper rod end bearing.

19. The system as recited in claim 13, wherein said electrically heatable elastomeric bearing is an elastomeric cylindrical bearing/damper seal.

20. A method of warming-up an elastomeric bearing comprising the steps of:
  (A) electrically heating at least one electrically heatable shim layer spaced between at least two of a multiple of elastomeric material layers of the elastomeric bearing.

21. A method as recited in claim 20, wherein step (A) occurs prior to start-up of a main rotor system of a rotary-wing aircraft.

22. A method as recited in claim 20, wherein step (A) occurs during flight of a rotary-wing aircraft.

* * * * *